United States Patent
Ho

Patent Number: 5,608,162
Date of Patent: Mar. 4, 1997

[54] METHOD AND SYSTEM OF TRAJECTORY PREDICTION AND CONTROL USING PDC BITS

[76] Inventor: Hwa-Shan Ho, P.O. Box 11170, Spring, Tex. 77391-1170

[21] Appl. No.: 502,117

[22] Filed: Jul. 13, 1995

Related U.S. Application Data

[62] Division of Ser. No. 151,102, Nov. 12, 1993, Pat. No. 5,546,141.

[51] Int. Cl.⁶ .................. B21K 5/02; E21B 7/04; E21B 44/00
[52] U.S. Cl. .......... 73/152.48; 175/24; 175/61; 175/45; 76/108.2; 76/108.4
[58] Field of Search .................. 73/151; 175/61, 175/24, 25, 26, 27, 45; 76/108.2, 108.3

[56] References Cited

U.S. PATENT DOCUMENTS

| | | | |
|---|---|---|---|
| 4,324,297 | 4/1982 | Denison | 175/45 |
| 4,739,841 | 4/1988 | Das | 175/61 |
| 4,804,051 | 2/1989 | Ho | 175/26 |
| 4,848,144 | 7/1989 | Ho | 73/151 |
| 4,958,517 | 9/1990 | Maron | 73/151 |
| 5,044,198 | 9/1991 | Ho | 73/151 |
| 5,139,094 | 8/1992 | Prevedel et al. | 175/61 |
| 5,220,963 | 6/1993 | Patton | 175/24 |
| 5,341,886 | 8/1994 | Patton | 175/24 |
| 5,419,405 | 5/1995 | Patton | 175/27 |
| 5,456,141 | 10/1995 | Ho | 76/108.2 |

*Primary Examiner*—Hezron E. Williams
*Assistant Examiner*—J. David Wiggins
*Attorney, Agent, or Firm*—Harrison & Egbert

[57] ABSTRACT

A method of forming a PDC drilling bit including the steps of imposing a side drilling direction on the bit, determining a total bit side force acting on the bit, computing a walk angle between the total side force and the side drilling direction, and modifying a configuration of cutters on the profile of the bit so as to change the walk angle to a desired angle. The step of determining a total side force includes the steps of determining a normal side force of the bit, computing a total cutter friction force, and combining the normal side force and the total cutter friction force so as to produce a total side force. The total cutter friction force is obtained by summing single cutter forces perpendicular to a direction of cut of the bit. The step of imposing a side drilling direction includes measuring a normal side force applied to the bit. The modification of the bit can be carried out by increasing or reducing the aggressiveness of the cutters facing outwardly on an outer surface of the bit or by replacing cutters on the bit with low friction pads.

10 Claims, 4 Drawing Sheets

METHOD AND SYSTEM OF TRAJECTORY PREDICTION AND CONTROL USING PDC BITS

RELATED APPLICATIONS

The present application is a divisional application of U.S. patent application Ser. No. 08/151,102, filed Nov. 12, 1993, and entitled "METHOD AND SYSTEM OF TRAJECTORY PREDICTION AND CONTROL USING PDC BITS", which is now U.S. Pat. No. 5,546,141, dated Oct. 10, 1995.

TECHNICAL FIELD

The present invention relates generally to polycrystalline diamond compact (hereinafter "PDC") bits. More particularly, the present invention relates to methods for the forming of such PDC bits for use in drilling operation. The present invention also relates to methods of trajectory prediction and control using PDC bits.

BACKGROUND ART

The oil and gas drilling industry has been undergoing dramatic technology improvements in the last decade, particularly in MWD (Measurement-While-Drilling), directional and horizontal drilling, improved drilling tools and equipments, particularly the PDC bits, and improved analysis and monitoring capabilities. The combined effect is that drilling cost has been steadily declining, and directional drilling, particularly high-angle, extended reach, and horizontal drillings have become much more popular, and will have expanded application in the future.

At the same time, due to major operators' cost cutting efforts and personnel down-sizing, more and more wells are being drilled on a "turn-key" basis, whereby service companies are asked to contract the entire drilling project at a predetermined benchmark fee, with huge incentives for faster and better drilling, and similar penalties for incurring drilling troubles and drilling delays.

The advent of these turn-key projects creates the economic condition under which service companies that are able to improve aspects of the entire drilling operation will reap major profits, while those who do not can suffer major losses. One single severe incident of a stuck-pipe, or a lost drill string, or a side track can mean a loss of hundreds of thousands, if not millions, of dollars in revenue loss.

Furthermore, drilling transcends beyond the drilling phase. Proper drilling has medium and long term impacts on the total economy of the well in many areas: completion and work over; reservoir maintenance, as well as reservoir recovery economy. If the drilled well has many problems, including over-crookedness (called "dogleg"), overgaged hole due to the need for reaming, etc., there will be additional cost in drilling fluid, and more problems in running and setting casing, cementing, completion, as well as potential plugging of the well due to an oversized wellbore. Conversely, by drilling a longer and smoother horizontal section, one can dramatically improve recovery economy, making thin producing zones more economical to develop, improve completion operation, improve cementing, and reduce the chance of plugging. In other words, to have the most profitable producing well, it is necessary to drill the best well possible.

A key to improving the quality of the drilled well path is to make the well trajectory as smooth as possible. To achieve this goal, in addition to the many ways to control the inclination angle of the well while drilling that are presently available, it is necessary to have very good azimuthal control, particularly in the horizontal section. This will greatly reduce the chance of having drilling troubles, and minimize the need for course corrections.

When drilling a long reach horizontal well, where the horizontal section is generally in formations that are reasonably isotropic, it is very desirable to use "anti-walk" bits. This will allow true azimuth control with minimum course correction necessitated by azimuthal drift. Such drift phenomenon is very apparent in downhole motor drilling which has a very high side force at the bit, due to the bent housing induced interference fit. Current bits have unquantified and uncontrollable walk tendencies. The result is that periodic tool face adjustments must be made in order to guide the drill in the proper direction. This creates wavy profiles in the well trajectory, which will cause greatly increased torque and drag, leading to stuck pipe and other serious drilling and completion problems.

A key to preventing pipe sticking is to improve the quality of the drilled well path, namely, to make the well trajectory as smooth as possible. This will reduce the torque and drag generated by the friction due to contacts of the drill-string with the borehole wall.

In order to achieve these objectives, it is essential that we understand the inherent deviation tendencies of the bit and BHA (bottomholeassembly) system, which may include a downhole motor with or without a bent housing.

There are no existing theories or models describing the inherent walk tendency of PDC bits. Attempts in quantifying the overall deviation tendencies of either the bit or the BHA started with a basic mechanics study of the BHA deformation analysis by Lubinski et al. "Factors Affecting the Angle of Inclination and Doglegging in Rotary Bore Holes", API Drilling & Prod. Pract., 1953, which included the formation anisotropy effects. Many works have been made since then on the study of either the effect of BHA deformation on the build-drop rate tendencies of the entire assembly, or the effect of bit's anisotropic drilling characteristics on the drilling deviation, or both.

The most comprehensive theory and model to date is that by the present inventor in "Prediction of Drilling Trajectory in Directional Wells Via a New Rock-Bit Interaction Model", SPE Ann. Conf., Paper #16658, 1987 and in "General Formulation of Drillstring Under Large Deformation and its Use in BHA Analysis", SPE Annual Technical Conf. and Exh., October 1986. These articles accounted for both the effects of anisotropy in both the bit and the rock, in addition to the side forces generated by the BHA, which is to be computed by a BHA analysis program which includes, for the first time, the nonlinear effects of drillstring's "large" deformation, particularly for medium radius drilling where the borehole's well path has a curvature (build or drop rate) of 10' to 30' per 1000' of well path.

This model was further described in U.S. Pat. No. 4,804,051, issued on Feb. 14, 1989 to the present inventor. This patent describes the model which accounts for anistropic drilling characteristics of both the formation and the bit. It is capable of predicting the walk tendency and the build-drop tendency of a given BHA (bottomhole assembly) under any drilling condition. The model can be used in the forward mode to predict the drilling direction; in the inverse mode to generate the rock and bit anisotropy indices; and in the log-generation mode to generate drilling logs, such as a drilling dip log.

However, even in the referenced model by Ho, the way the anisotropy effects are accounted for is through a "global"

correlation, using the rock and bit anisotropy indices. It has the following limitations: (1) Irrespective of any detailed PDC bit cutter arrangements, a single bit anisotropy index is sufficient to describe the deviation tendency of the bit; (2) When drilling in isotropic formations, the bit axis, the total bit force, and the drilling direction are coplanar such that the PDC bits will not walk; (3) The rock antsotropy index is assumed to be an inherent formation property, and independent of the bit's cutter design, so as to be independent of the bit antsotropy index, or the detailed cutting action of the bit; and (4) The model does not work when drilling through formation interfaces. This may be a significant drawback, particularly when drilling through alternating hard and soft sand-shale sequences.

Field experiences have shown that PDC bits generally walk left, although some bits walk right. However, such field observations do not separate the effects of formation anisotropy, formation dip, the BHA design, as well as the effect of borehole trajectory and inclination. Although some nonlinear effects can be generated in drilling in a curved well path, the effect is small, and cannot account for all the walk tendencies that have been observed. Formation anisotropy can also induce walk tendency.

Failure to account for the walk tendency of the PDC bit-BHA system will result in frequent course corrections. Such course corrections may require tripping in rotary drilling, which is very time consuming and therefore very expensive. In downhole motor drilling, such course corrections are achieved through frequent tool face adjustments. Though this eliminates the tripping time, it increases the well path's crookedness, which greatly increases the chance of the assembly getting stuck, resulting in major expenses. Furthermore, the fear of getting stuck particularly in the horizontal section of the well, places a major limitation on the length of the horizontal reach one can drill into. This limitation inhibits the major economic potential of drilling such horizontal wells.

One technique employed in the past has been the development of bits having a prescribed walk tendency. U.S. Pat. No, 5,099,929, issued on Mar. 31, 1992, to Keith et al. describes an unbalanced PDC drill bit having right hand walk tendencies plurality of stationary cutter elements are fixedly mounted to the cutting face in a selected pattern so as to provide a region of high cutter density on one side of the cutting face, and a region of low cutter density on the other side of the cutting face. The stationary cutter elements operate to cut into the lower side wall of the wellbore as the bit body is rotated, causing the rotary drill bit to walk to the right.

It is an object of the present invention to provide a method that allows the deviation characteristics of the PDC bit to be determined.

It is another object of the present invention to provide a method whereby PDC bits can be designed with known quantitative walk tendencies.

It is a further object of the present invention to provide a method whereby the walking tendencies of PDC bits can be determined so as to allow for the planning of well paths in a manner most suitable for the bits.

It is a further object of the present invention to provide a method that can enable the completion of a long bit run without trippings or course corrections.

It is a further object of the present invention to provide a method whereby formation dip can be determined from walk tendencies of the bit.

It is a still another object of the present invention to provide a method which greatly reduces the total drilling cost of directional wells, and which provides greater ease in completion and cementing.

It is a further object of the present invention to provide a method which serves to reduce the total developmental cost of the oil and gas field and to enable the development of currently marginal fields.

These and other objects and advantages of the present invention will become apparent from a reading of the attached specification and appended claims.

SUMMARY OF THE INVENTION

The present invention is a method of forming a PDC drilling bit with a desired walk tendency which includes the steps of: (1) imposing a side drilling direction vector of the bit; (2) determining a total bit side force vector acting on the bit; (3) computing a walk angle between the total side force vector and the side drilling direction vector; and (4) modifying a configuration of cutters on the bit so as to change the walk angle to a desired angle.

The step of determining the total bit side force vector includes the steps of determining a normal side force vector of the bit, computing a gage cutter friction force vector, and combining the normal side force vector and the gage cutter friction force vector so as to produce the total side force vector. The gage cutter friction force vector includes the step of summing the single cutter friction forces parallel to a direction of cut of the bit.

Under the circumstances where the bit is a concave bit, the step of determining the force vectors includes the steps of: (1) computing an outer cutter friction force for the outwardly pointing cutters of the bit; (2) computing an inner cutter friction force for cutters on an inner inverted cone section of the bit; and (3) comparing the outer cutter friction force and the inner cutter friction force so as to define the walk angle of the bit. So as to obtain an anti-walk bit, it is necessary to modify the cutters on the bit such that the outer cutter friction force generally equals the inner cutter friction force.

In the present invention, the step of determining a side drilling direction vector includes the measurement of a normal side force applied to the bit.

The bit can be modified in a variety of ways so as to change the walk angle of the bit. The modifying can include an increase of the inner cutter friction force acting within the inner inverted cone section of the bit. This can be accomplished by increasing a height of the inner inverted cone section or by increasing the aggressiveness of the inwardly facing cutters on the inner inverted cone section. The step of modifying can further include the step of decreasing the outer cutter friction force on the bit. This step of decreasing the outer cutter friction force can be accomplished by reducing the aggressiveness of the cutters facing outwardly on an outer surface of the bit or by replacing the cutters on the bit with low-friction pads.

In general, the present invention specifically addresses the bit's walking tendency by integrating the single cutter response characteristics in such a way that enables the determination of the deviation characteristics of the PDC bit. This can be accomplished by considering the force and drilling components in the cross-sectional plane of the bit. This results in the derivation of an intrinsic "walk angle" of the PDC bit. By varying the bit profile, and the face and gage cutter arrangements, the anti-walk bit can be designed and manufactured. An "anti-walk" bit means a bit which will not walk when drilling into isotropic formations. Alternatively, by quantifying the inherent walking tendency of PDC bits, it is possible to plan the well path in a manner most suitable for the bits. Conversely, when provided with a series of PDC bits with known quantitative walking tendencies, it is possible to choose the appropriate one for the particular 3-D well path section desired.

In a further embodiment of the present invention, a method of trajectory control of the PDC bit is provided. This method includes the steps of: (1) determining a bit deviation tendency for the PDC bit while in the process of drilling a borehole; (2) measuring side forces and bending moments affecting the bit while in the process of drilling a borehole; (3) estimating response characteristics of the bit for a given bit advance based on the measured side forces, bending moments and bit deviation tendency; and (4) controlling a movement of the bit relative to the estimated response while in the process of drilling a borehole.

The step of determining the bit deviation tendency includes determining an inclination deviation tendency of the bit and calculating a walk tendency of the bit. The step of measuring includes the step of measuring lateral displacement and rotation of the bit. The step of estimating response characteristics includes estimating the response characteristics following at least one complete revolution of the bit. The individual cutter forces are integrated over an entire profile of the bit so as to determine the total force and moment on the bit. The intrinsic walk angle of the bit is determined between a direction of the side forces and an actual side advance of the bit. The bit is controllably moved relative to the intrinsic walk angle of the bit.

DETAILED DESCRIPTION OF THE INVENTION

Figure 1:
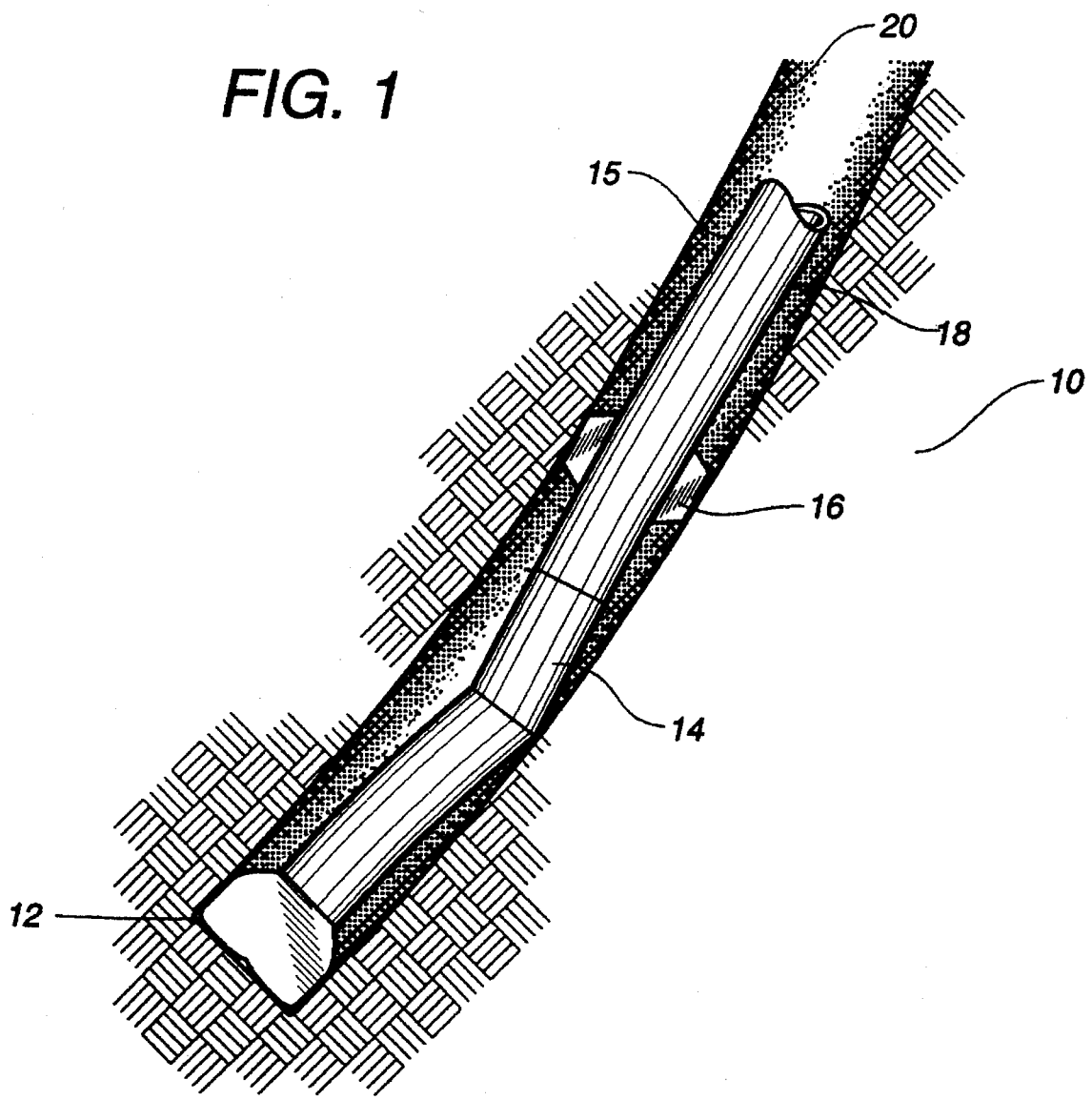
FIG. 1 is a cross-sectional view of a typical downhole assemblage used in directionally controlled drilling and having a PDC bit and a bottomhole assembly.

Referring to FIG. 1, there is shown at 10 a typical downhole assemblage used in directionally controlled drilling. The assemblage 10 includes a PDC bit 12, a bottomhole assembly 14, and a drill collar 16 affixed along drill string 18. The PDC bit 12 is shown of the inverted profile variety. The present invention contemplates a variety of PDC bits having multiple PDC cutters distributed in certain ways throughout the bit face. The profile of the bit face may be generally convex, concave, or flat. The bit 12 may be substantially cylindrical or may be made up of several ribs in a fish-tail profile. The bottomhole assembly 14 can include a downhole motor with or without a bent housing or bent sub. The drill collars 15 are affixed to the drillstring 18. The collars 15 may have various stabilizers 16 with full-gaged or under-gaged blades. The bottomhole assembly 14 can be interconnected to controls at the surface of the well in a conventional fashion. The bottomhole assembly 14, in combination with the bit 12, and the collar 15 can provide a means for controlling the trajectory of the drilled well path 20. The stabilizers 16 may be adjustable in various ways.

The present invention uses a single cutter force-cutting relationship in order to develop the total force/cyclical cutting relationship of an entire PDC bit. The single cutter model may be dependent upon the back rake and side rake angles, as well as the relative orientation of the cutter stud axis with respect to the face of the bit profile.

Formation of PDC Bits for Controlling Walk Tendency

Figure 2:
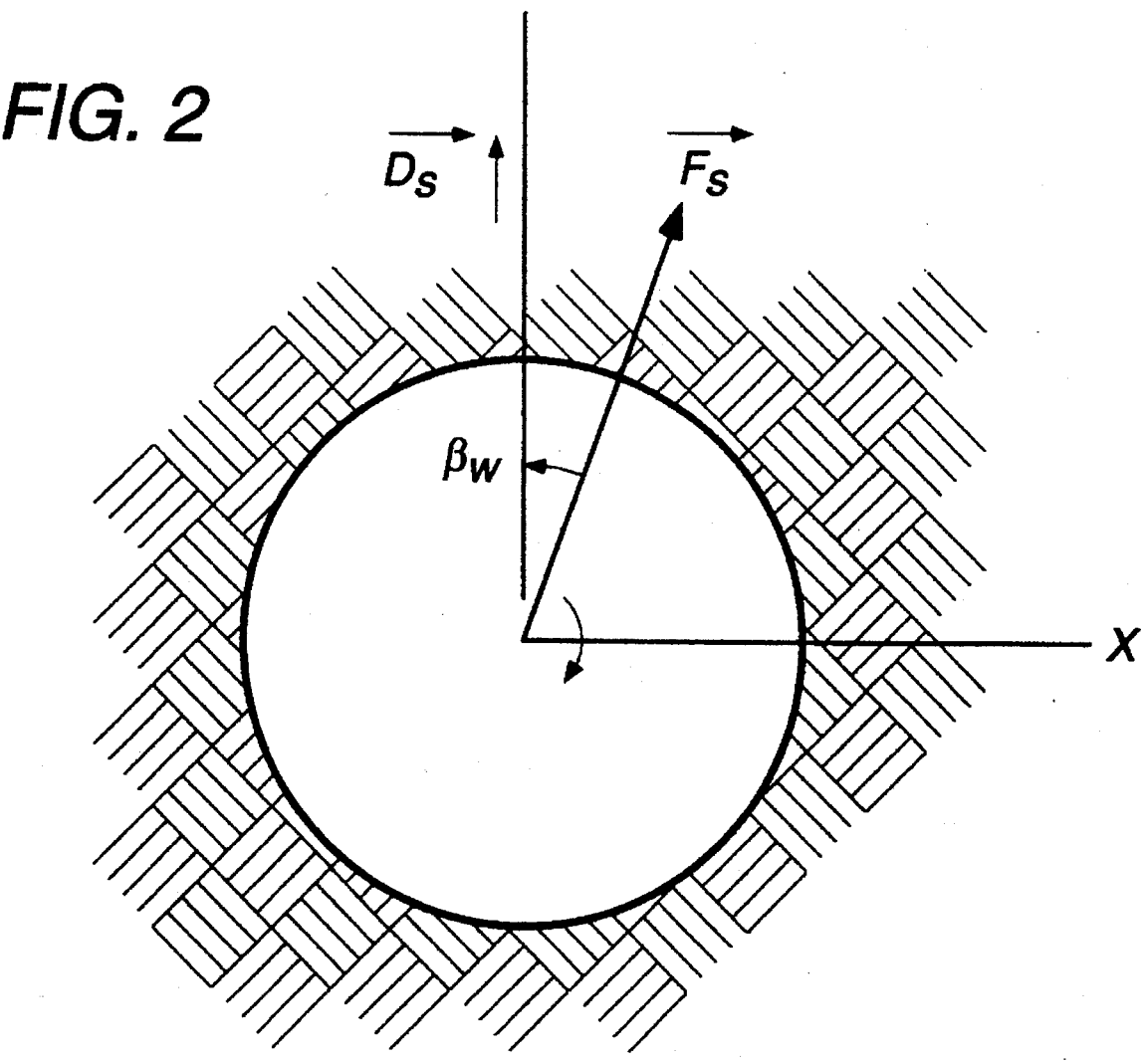
FIG. 2 is a cross-sectional view of the bit in a plane normal to the bit and illustrating the forces acting on the bit.

Walk is defined as the tendency to drill to the left or right of the applied side force on the bit. FIG. 2 illustrates the projection of the forces acting on the bit in the plane normal to the bit and drillstring axis, which points downward into the paper. The bit is rotating clockwise. It exerts a total bit side force $\vec{F}_s$ (as shown build force) onto the formation, but the bit drills laterally along the side drilling direction $\vec{D}_s$. If $\vec{D}_s$ points to the left of the force vector $\vec{F}_s$ as shown in FIG. 2, it implies a "left-walking" bit. Conversely, if the side drilling vector points to the right of the side force vector, it implies a right-walking bit. For anti-walk bits, the side force vector and the side drilling vector will coincide in their directions. The angle between $\vec{F}_s$ and $\vec{D}_s$ is the walk angle $\beta_w$, defined positive if it walks right while drilling with a clockwise sense of bit rotation.

Figure 3A:
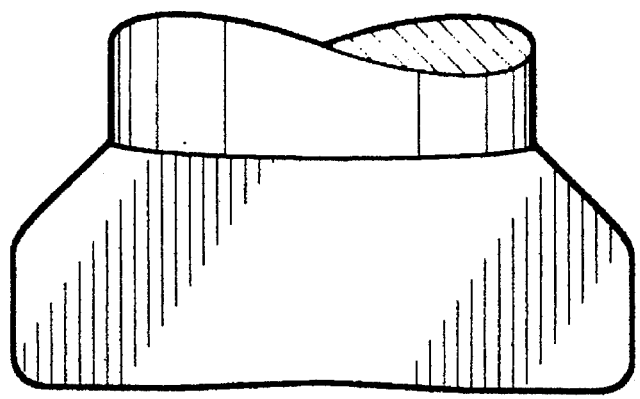
FIG. 3a is a side view of a flat profile bit.
Figure 3B:
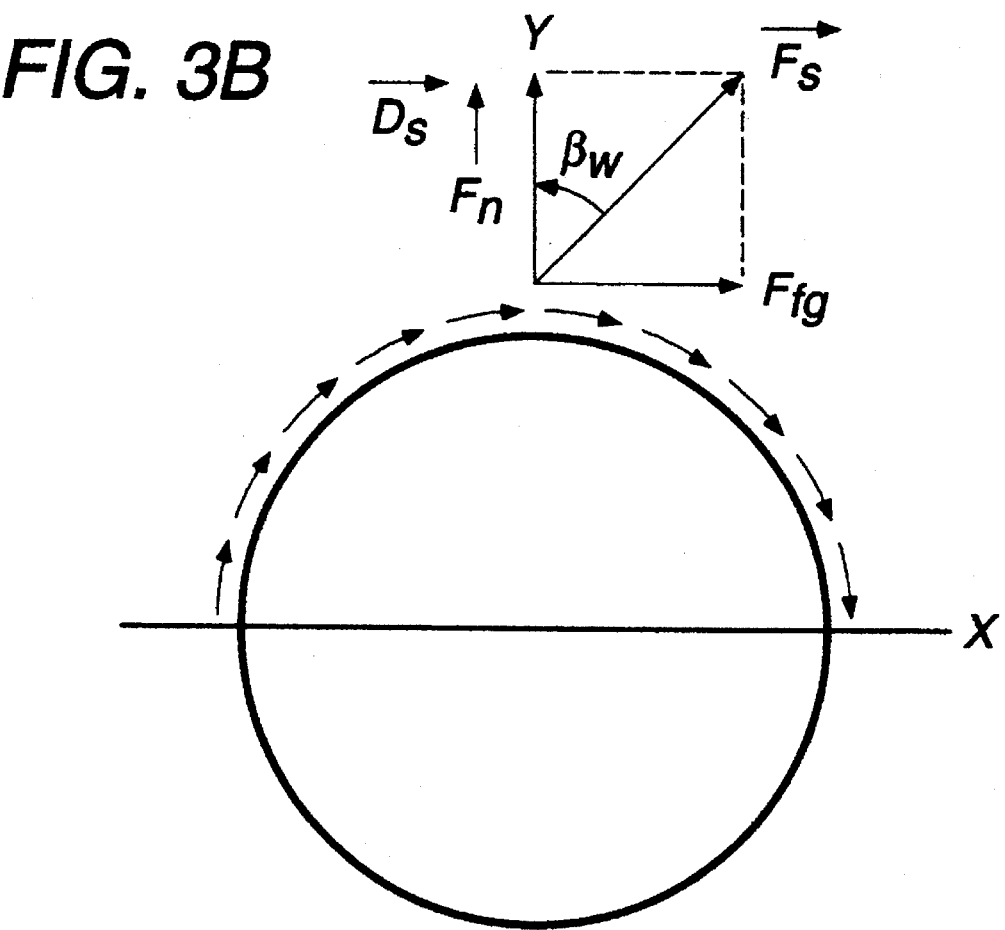
FIG. 3b is a cross-sectional view taken across a plane normal to the bit showing the forces affecting the bit.

The reason PDC bits walk is that friction force is generated at all the active cutters. FIG. 3 illustrates this phenomenon for a bit with only gage cutters. Assuming we hold the bit to drill in the drilling direction $\vec{D}_s$, this requires the application of a "normal side force" $F_n$ in the drilling direction, and only the top half cutters in the positive Y-axis direction are active. Since the bit rotates clockwise as shown, each of these cutters exerts a cutter friction force parallel to its respective direction of cut. These non-uniform "distributed" single cutter forces can be summed to yield a total "gage cutter friction force" $F_{fg}$. Combining the components $F_n$ and $F_{fg}$ into the total side force vector $\vec{F}_s$, we observe that it is in a different direction than the side drilling vector $\vec{D}_s$.

All gage cutters and any cutter that faces outward from the bit axis will contribute to such right-pointing cutter friction force, which will be called "outer cutter friction force" $F_{fo}$. Therefore, whenever the PDC bit's side cutting is predominantly effected by side gage cutters alone, the bit will walk left.

Figure 4A:
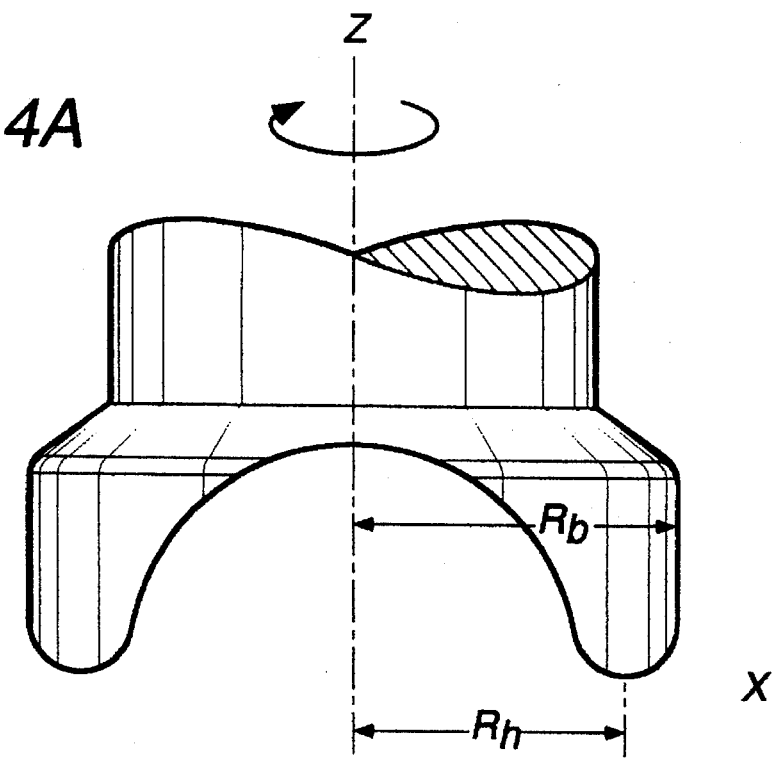
FIG. 4a is a cross-sectional side view showing an inverted profile bit.
Figure 4B:
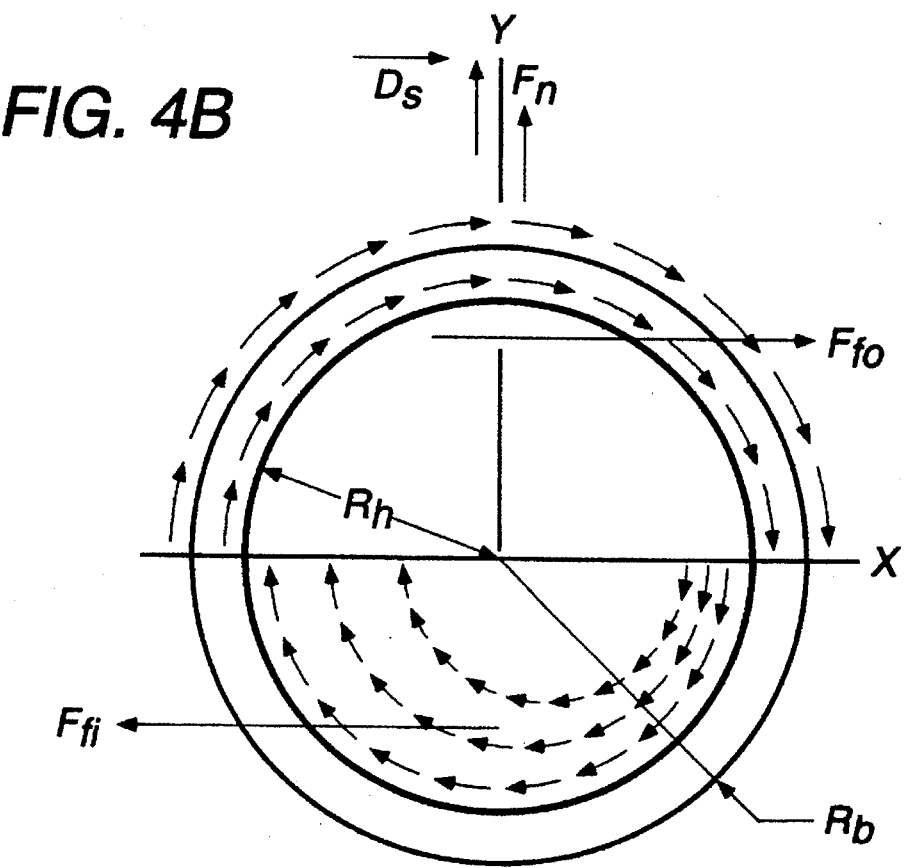
FIG. 4b is a cross-sectional view in a normal plane to the bit showing the forces acting on the bit.

In order to counteract the above action, an inverted bit profile is necessary, so that there are cutters facing inward toward the bit axis, as shown in FIG. 4a. Among the cutters outside the radius $R_h$, only the top half cutters are active, and contribute to the total outer cutter friction force $F_{fo}$, pointing to the right. On the other hand, among the cutters within the radius $R_h$, only the lower half cutters are active, and contribute to "inner cutter friction force" $F_{fi}$ in the opposite direction of that generated by the outer cutters, $F_{fo}$, as shown in FIG. 4b.

For bits with larger outer cutter friction force, i.e.:

$$F_{fi} < F_{fo}$$

it will walk left. Similarly, it will walk right if it has larger inner cutter friction force:

$$F_{fi} > F_{fo}$$

It is now a matter of quantitatively defining all these friction forces, so that, for anti-walk bits, we have the following relation:

$$F_{fi} = F_{fo}$$

To modify the PDC bits' left-walking tendency due to the outer cutters, a combination of two approaches can be adopted. The interior cutter friction force $F_{fi}$ can be increased and/or the outer cutter friction force $F_{fo}$ can be reduced.

The more deeply inverted the inner cone is, along with more aggressive face cutters in the inverted cone section (within the radius $R_h$ in FIG. 4a), the greater the inner friction force will be. However, hydraulic requirements may preclude making very deep inverted bit profiles. In this case, an alternative approach is to reduce the outer (especially the gage) friction force. This can be achieved by reducing the aggressiveness of the gage cutters, or by using "anti-friction pads" (such as round-shaped diamonds) around the gage periphery. By such combination of approaches, the anti-walk bit is designed.

The anti-walk PDC bits designed by the method of the present invention have two important applications. First, it can be used in drilling smooth 2-D directional wells, particularly in the horizontal section, so as to enable drilling a longer horizontal, extent. Since the producing formations are generally isotropic (sand or limestone), using anti-walk bits has great advantage in allowing the drilling of true smooth 2-D wells with fewer problems and less tripping. In the horizontal section, a straight well can be drilled. This allows the drilling of a longer horizontal section, thereby greatly improving the reservoir production economy. Secondly, it can be used to obtain a formation dip log when drilling into anisotropic formations Such as shales. When drilling without active walk-deflection devices such as a bent sub/bent housing, or when the tool face is set at zero or 180 degrees, the use of the anti-walk bits will maintain a true 2-D well path, if drilled into isotropic formations or formations with zero dip angles. Therefore, any walk tendency can be attributed to formation dip effect of the anisotropic formations. The formation dip can then be inferred from such walk tendencies. This allows the production of drilling dip logs, which have important implications in geology mapping, and formation evaluation measurements and interpretations.

The method of the present invention allows PDC bits to be designed for specific left-, right-, or anti-walk tendencies. The single-cutter drilling model, as described in the present invention, relates to the forces necessary to maintain the single cutter in any given drilling direction. The model may be calibrated in the lab for any given orientation of the cutter, including the tilt, back rake, and side rake angles, as well as the depth of cut (or the cutter's normal indenting force). The outer cutter friction force is computed based upon the given laterally applied bit force which is needed to maintain the side cutting vector. The outer cutter friction force should be calculated for any given gage and outwardly pointing cutter arrangement. Similarly, the inner cutter friction force of inverted PDC bits should be calculated for the inner inverted cone section of any given inverted bit profile and cutter arrangement. Alternatively, the total cutter friction force of the PDC bits can be measured for the given applied normal side force for any given bit profile and cutter arrangement. The total bit side force vector is computed so as to determine the "walk angle" between the total side force vector and the imposed side drilling vector. The sign convention is that, if the side force vector points to the right of the drilling direction, with the bit facing downward and rotating clockwise, the angle is negative, and the bit will walk to the left. If the walk angle is zero, then the bit is an anti-walk bit.

The bit can be modified in a variety of ways. First, the bit can be modified by increasing the inner cutter friction force. This can be accomplished by increasing the height of the inverted inner cone or by using more aggressive inwardly-facing cutters. Alternatively, the outer cutter friction force can be decreased by reducing the aggressiveness of the outwardly facing cutters or by using low-friction gage pads or round diamond studs. In order to design an anti-walk bit, the various bit design parameters can be varied until the inner and outer cutter friction forces are equal.

The method of the present invention also allows directional wells to be drilled using pre-determined left or right walking PDC bits with a known "bit walk angle". This enables the drilling of the well with a known rate of left or right turning during the building section of the well (or right and left turning during the dropping section), or when the downhole motor with bit housing is used. This procedure is particularly useful for drilling 3-D wells, for optimum course corrections, and for avoiding collisions against existing subterranean structures and/or existing wells. This further improves the flexibility of drilling directional wells, and of extending the reach from a single work site or platform.

In particular, such control of the trajectory of the PDC bits is described hereinafter.

Trajectory Prediction and Control

The present invention also concerns the prediction and control of the actual drilling system in terms of the build/drop rate and the walk rate. This method requires integrating the response characteristics of both the bit and the bottom-hole assembly as a whole, utilizing the bit response characteristics as described hereinbefore. This enables the development of a precise trajectory prediction and control system.

The present invention uses a single cutter force-cutting relationship in order to develop the total force—cyclic cutting relationship of a whole PDC bit. The single cutter model may be dependent on the back rake and side rake angles, if present. In a preferred approach, the key force quantities included in the model are the two force components perpendicular to the path of the cutter, one as the normal force, parallel to the cutter, and the other as the side force, perpendicular to the cutter. The force component along the direction of the cutting path is not specifically included in the model. Instead, a "friction coefficient" $\mu$ is used. This process generates the "Drilling Hardness Matrix" expressing the five independent bit force components, including the WOB (weight-on-bit), two side forces, and two bending moments, to the five independent cutting rate components, including the axial cutting rate, the two side cutting rates, and two bit turning rates. This relation may be inverted to yield the bit's "Drilling Response Matrix". In an alternative approach, the entire single cutter force-cutting rate relation may be used directly for integration over the bit to generate the bit response matrix.

The bit's coordinate system is defined as follows: Z along bit's axis, positive pointing uphole; X & Y are in-plane of bit's cross section, where. X axis passes the first (reference) cutter. Following observed single cutter behaviors, the following general, but linearized single cutter drilling rate equation is developed, where the minus sign accounts for the reversed sense of cutting direction and the force bn the cutter:

$$\vec{f}_c = -\alpha \vec{A} \cdot \vec{d}_c \tag{1}$$

In equation (1), the Coefficient α is a scale factor depending on the cutter geometry and the rock drilled, and the diadic A represent the total possible set of force components that may arise from the cutter advance. The force vector $\vec{d}_c$ represents the drilling rate vector for an individual cutter over one cycle.

A more general non-linear cutter relation may be employed at the expense of much greater complexity of the final relation between the bit cutting action and the resultant bit force, which will also be non-linear. It is justified only if much more data are gathered and better understanding has been gained regarding the single cutter model, as well as its effect on the overall cutting action of the bit.

In the preferred approach of the model, the component of the force vector in the direction of sliding is separated, and is called the sliding force component, $f_{cs}$ which is always perpendicular to the cutting rate vector. This component is related by the "friction coefficient" μ to the "effective cutter force" $\vec{f}_{ce}$, which is the resultant of the other two components in equation (1).

This "effective cutter force" vector can be further decomposed as the "cutting force" component which is parallel to the cutter advance direction, and the "side force" component. The side force component arises when there exists a side rake angle, or when the cutter axis does not coincide with the cutting vector, or when cutting into anisotropic formations along certain orientations.

For simple situations, and to start with the model, it is assumed that no side force component exists for the cutter. The simple relation is therefore expressed:

$$\vec{f}_{ce} = -\alpha \vec{d}_{cs} \qquad (2)$$

Here, the coefficient α represents the totality of the effects of cutter geometry, the rock property, and the "effective cutter coverage area". It can be further postulated to have the form:

$$\alpha = \frac{I_H I_D a_c}{I_a n_c p_o} \qquad (3)$$

where $p_o$ is the new cutter's intrinsic cutting efficiency under reference conditions (reference rock, reference cutter rake angle), $I_a$ is the index for various rake angles, $I_H$, is the index for various rock cutting hardnesses, and $I_D$ is the index for cutter dullness. Finally, $a_c$ represents the "effective cutter coverage area" for the cutter, and n represents the number of cutters traversing through the said location in one revolution.

The rationale behind equations (2-3) can be explained by comparing the cutting effects of a bit with a single cutter, and one with two identical cutters diametrically opposed. For the two-cutter bit under the same WOB, after one revolution, the total drilling advance would double, while the force on each cutter will be halved, compared to the bit with a single cutter. Therefore, both the coverage area $a_c$ and the number of cutters $n_c$ are needed in the formulation.

The second part of the model involves the determination of the local (cutter) kinematics from the global (bit) kinematics. The general (quasi steady-state) motion of the bit, after one revolution, is composed of the following: (1) Rotation speed, ω=RPM, which yields the time for one revolution, and is not a cutting rate quantity; (2) The bit cutting rate vector $\vec{D}$, which can be further decomposed into an axial cutting rate component, $D_a$, and side cutting rate components $D_x$ and $D_y$; and (3) The turning rate vector $\vec{\phi}$ with rate of angles angles $\phi_x$ and $\phi_y$, about the x and y axes, respectively. The last five components in (2) and (3) constitute the total set of independent cutting rate variables.

From these global kinematics, the local kinematics at any cutters can be defined as follows:

$$\alpha_c = -D_z \vec{e}_z + \vec{D}_s + \vec{\phi} \times \vec{r} \qquad (4)$$

However, this cutter advance rate vector must exclude any component along the sliding direction, $\vec{e}_s$, resulting in the following "effective cutter advance vector":

$$\alpha_{ce} = -D_z \vec{e}_z + \vec{D}_s + \vec{\phi} \times \vec{r} + [(\vec{D}_L + \vec{\phi} \times \vec{r}) c \vec{\theta}_3] \vec{\theta}_3 \qquad (5)$$

Once the global bit advance vector is described, equation (5) can be used to find the local cutter advance vector, and then the effective single cutter equation (3) can be used to find the effective force $f_{ce}$ acting on the cutter. The total cutter force is then:

$$\vec{f}_c = \vec{f}_{ce} - \mu f_{ce} \vec{e}_z \qquad (6)$$

The resultant force on the bit is then the integration of the cutter forces over the bit, as follows:

$$\vec{f}_b = \Sigma \vec{f}_{ci} \quad \vec{M}_b = \Sigma \vec{r} \times \vec{f}_c \qquad (7)$$

The force resultants can be decomposed into an axial force (WOB) component $F_z$ in the +Z direction, and the two side force components $F_x$ and $F_y$. The moment resultants are similarly decomposed into the axial component, $T_b$ which is the torque on bit (TOB), and the bending moments $M_x$ and $M_y$. The five independent bit force components are WOB, two side forces, and two bending moments.

The above force resultants can be expressed as a function of the "Bit Drilling Hardness Matrix" $K_B$ relating the five penetration rate and displacement components $D_a$, $D_x$, $D_y$, $\phi_x$ and $\phi_y$ to the five bit force components $F_a$, $F_x$, $F_y$, $M_x$, $M_y$ as follows:

$$\begin{Bmatrix} F_a \\ F_x \\ F_y \\ M_x \\ M_y \end{Bmatrix} = (K_B) \begin{Bmatrix} D_a \\ D_x \\ D_y \\ \phi_x \\ \phi_y \end{Bmatrix} \qquad (8)$$

Finally, the drilling stiffness matrix can be inverted to obtain the "Bit Drilling Response Matrix" $R_B$ relating the five bit penetration rate displacement components $D_a$, $D_x$, $D_y$, $\phi_x$ and $\phi_y$ to the five bit force components $F_a$, $F_x$, $F_y$, $M_x$, $M_y$ as follows:

$$\begin{Bmatrix} D_a \\ D_x \\ D_y \\ \phi_x \\ \phi_y \end{Bmatrix} = (R_B) \begin{Bmatrix} F_a \\ F_x \\ F_y \\ M_x \\ M_y \end{Bmatrix} \qquad (9)$$

The bit drilling hardness matrix and drilling response matrix reflect the intrinsic behavior of the PDC bit under any drilling condition. They are used to obtain either the instantaneous penetration rates and rotation rates under any prescribed bit loads, or to infer the required bit loads in order to achieve the desired penetration rates. They are essential in any drilling trajectory prediction and control system or program.

The resultant side force is defined as:

$$\vec{F}_s = F_x \vec{e}_{xi} + F_y \vec{e}_{yi} \quad (10)$$

where the magnitude and the direction are:

$$F_s = \sqrt{(F_x^2 + F_y^2)}, \text{ and } \theta_{sf} = \tan^{-1}(F_y/F_x) \quad (11)$$

Similarly, we define the resultant side cutting rate as $D_s$, equal to $\sqrt{(D_x^2 + D_y^2)}$, $$\vec{D}_s = D_x \vec{e}_x + D_y \vec{e}_y \quad (12)$$

where the magnitude and the direction are:

$$D_s = \sqrt{(D_x^2 + D_y^2)}, \text{ and } \theta_{sd} = \tan^{-1}(D_y/D_x) \quad (13)$$

The bit's deviation tendencies are defined by the two parameters: side cutting anisotropy index $I_S$, and the intrinsic walk angle $\beta_w$, to be defined in the following. The side cutting anisotropy index, $I_S$, is the ratio of the side penetration efficiency (side penetration rate per unit side force) to that of the axial penetration efficiency (axial penetration rate per unit axial force), as follows:

$$I_s = \frac{D_s/F_s}{D_a/F_a} \quad (14)$$

and the intrinsic walk angle, $\beta_w$ is defined as:

$$\beta_w = \theta_{sf} - \theta_{sd} \quad (15)$$

The meaning of $I_s$ is similar to the bit's anisotropy index for the situation where the intrinsic walk angle is assumed to be always vanishing, that is, when the side penetration direction coincides with the side force direction. When this ratio is unity, there is an isotropic bit with bit index equal to one.

The intrinsic walk angle $\beta_w$ is a new quantity that depicts the increase in the azimuth angle of the cutting direction when the bit is subject to a side cutting force, namely, a right-walking tendency during building when this angle is positive. This is a quantity that has not been considered in the past. It is a natural phenomenon existing in any PDC bit. It is important to note that this intrinsic walk angle is substantially independent of the magnitude of the WOB.

Note that the above side cutting index and intrinsic walk angle do not directly yield the actual build-drop rate and walk rate of the drilled well path. Additional computational procedures coupling the BHA response characteristics are needed to arrive at the predicted well path.

This PDC bit model can be effectively utilized to design the PDC bits for a desired deviation and walk tendencies, by varying the cutter arrangements, the bit profile, the gage cutters, and the gage length. In fact, it is possible to design PDC bits to have zero walk tendencies (anti-walk bits), when the bit is used to drill in isotropic formations or where the formation dip is substantially zero. This can be a great asset for the drilling industry, since most producing zones are either sandstones or carbonates, and are fairly isotropic. Using such anti-walk PDC bits in conjunction with horizontal drilling will have the following advantages: (1) Straight and smooth well bore; (2) Reduced torque and drag, (3) Much longer horizontal reach, resulting in much greater recovery economy; (4) Much less drilling trouble, and (5) Much more accurate MWD survey so as to eliminate the need for any wireline confirmation surveys.

When drilling into a formation interface, such as one between a sand-shale sequence, the different drilling hardness $I_H$ appearing in the factor $\alpha$ will cause bit turning, and this model will predict bit bending moments.

When drilling into anisotropic formations, the single cutter response model, equation (2) will be dependent on the formation bedding direction. The cutter force vector and the cutting rate vector can be decomposed into a normal component with respect to the formation bedding plane, $\vec{e}_n$, and a remaining parallel component, $\vec{e}_p$:

$$\vec{f}_c = f_{cn}\vec{e}_n + f_{cp}\vec{e}_p = f\vec{e}_{ti} \quad \vec{d}_c = d_{cn}\vec{e}_n + d_{cp}\vec{e}_p = d\vec{e}_d. \quad (16)$$

The original equation in (2) implies that the parallel cutting efficiency (which is to $d_{cp}/f_{cp}$ is the same as the normal cutting efficiency (which is $d_{cn}/f_{cn}$).

For anisotropic rocks, we have:

$$I_r = \frac{\text{parallel cutting efficiency}}{\text{normal cutting efficiency}} = \frac{d_p/f_p}{d_n/f_n} \quad (17)$$

Denoting the angle between $\vec{e}_n$ and $\vec{e}_d$ by $\theta_d = \cos^{-1}(e_d \cdot e_n)$ the following can be derived:

$$I_c = -\frac{\alpha}{I_r}[\vec{e}_d + \cos\theta_d(I_r - 1)\vec{e}_n] \quad (18)$$

however, the component of the cutter force vector in the sliding direction must first be removed in the preferred method of the model.

Alternatively, the single cutter force equation can be used directly to integrate the entire bit response relation, without first decomposing into effective cutting forces and sliding (friction) forces. In this case, the friction coefficient will appear in the single cutter response equation (1).

The present method of trajectory prediction and control is employed for directional drilling in oil and gas exploration and production. The system includes a PDC bit deviation and response model that accounts for the inherent deviation tendencies of the PDC bit, including both the inclination deviation tendency and the walking tendency. A bottomhole assembly analysis program is provided which includes the bit, the lateral displacement and rotation at the bit, and the side forces and bending moments at the bit. An interactive scheme is provided where, under given bit advance after one revolution, the response characteristics of the entire bottomhole assembly-bit assembly is estimated. This is incorporated into the subsequent behavior relating to the drilling characteristics of the bit. As such, the bit can be properly controlled, as required, so as to produce the desired drilling path.

In this method, the individual cutter's advances are computed from the prescribed global bit advance after at least one revolution under assumed steady-state drilling. The cutter advances are further decomposed into a sliding component and an effective component. The effective individual cutter forces, acting perpendicular to the sliding direction of the cutter, are functionally related to the effective cutter advance. The sliding component of the cutter force is related to the effective force component through a "friction" coefficient. The various relationships described hereinbefore may be functions of the cutter rake angles and may be calibrated through lab measurements. A simple proportionality factor may be determined between the effective cutter advance and the effective cutter force as a function of the rock's drillability. The total force and moment on the bit are obtained from the integration (or summation) of the individual cutter forces over the entire bit profile, including the gage portion.

The present invention includes a procedure wherein the bit's five independent force resultants are computed from the bit's five independent penetration rate components through the bit's "drilling hardness matrix". Conversely, the bit's five penetration rate components are computed from the five bit force components through the bit's "drilling response matrix".

The method of the present invention allows for the computing of the bit's side deviation tendency so as to result in the "side-cutting anisotropy index" of the bit. This index is the ratio of the side cutting efficiency to the axial cutting efficiency.

The bit deviation and response model, described hereinbefore, may be used for drilling into formation interfaces, where the cutter response coefficient accounts for the different formation drillabilities. This response model may also be extended into drilling into anisotropic formations.

A software monitoring system may include the above-described PDC bit model. An analysis program can be coupled to the bottomhole assembly-bit system. This can be incorporated with the real-time measurement-while-drilling (MWD) survey measurements with or without additional force/moment measurements near the bit. An iterative interpretation method is part of the present invention where the measured bit forces are used, with the known bit deviation tendencies, to infer the drilled path. Further extensions of the drilled path are generated by the coupled bottomhole assembly-bit response analysis program, and the results are compared to the well path as defined by the real time MWD survey data. Any discrepancies are indications of the formation drillability, possible formation interface, and/or anisotropic formations.

The foregoing disclosure and description of the invention is illustrative and explanatory thereof. Various changes in the details of the method of the present invention may be made within the scope of the appended claims without departing from the true spirit of the invention. The present invention should only be limited by the following claims and their legal equivalents.

Nomenclatures $\vec{e}_z$: Unit vector along bit's (Z-) axis, positive uphole $\vec{e}_x$: Unique vector along in-plane X-axis through the reference cutter #I $\vec{e}_y$: Unique vector along other in-plane Y-axis;

$\vec{e}_r$: Unique vector along any in-plane radial direction, making angle θ with the X-axis, toward the Y-axis $\vec{e}_s$: Unique vector along sliding direction of cutter, circumferential $\vec{e}_t$: Unique vector in radial plane, parallel to bit profile $\vec{e}_n$: Unique vector in radial plane, normal to bit profile $\vec{e}_N$: Unique vector normal to bedding plane of anisotropic formation $\vec{e}_p$: Unique vector parallel to bedding plane of anisotropic formation $\vec{d}_c$: Drilling rate vector for individual cutter over one cycle $\vec{f}_c$: Resultant force vector on individual cutter over one cycle $\vec{D}_b$: Drilling rate vector for the bit over one cycle $\vec{F}_b$: Resultant force vector on the bit over one cycle $I_s$: Bit's side cutting anisotropy index $\beta_w$: Bit's intrinsic walk angle

I claim:

1. A method of trajectory control of a PDC (Polycrystalline Diamond Compact) drill bit attached at the bottom of a drill string used for drilling a borehole through an earth strata formation and thereby achieve a predetermined intended path of PDC bit controlled trajectory comprising the steps of:

determining a drill bit path or trajectory deviation tendency for the PDC drill bit;

determining side forces and bending moments of the PDC drill bit;

estimating response characteristics of the PDC drill bit for a given bit advance in the downward axial direction based upon the determined side forces and bending moments and on the determined bit deviation tendency; and controlling a simultaneous and/or subsequent lateral movement of the PDC drill bit relative to the estimated response for said PDC drill bit undergoing a given bit advance so as to compensate for drill bit path or trajectory deviation.

2. The method of claim 1, said step of determining the bit deviation tendency comprising the steps of:

imposing any one of five independent cutting actions on the PDC drill bit;

determining all five resulting force components of the PDC drill bit via appropriately oriented sensors disposed adjacent of the PDC drill bit;

forming a drilling hardness matrix based upon the resulting force components;

inverting the drilling hardness matrix to obtain a drilling response matrix; and determining cutting action of the PDC drill bit based on any imposed forces or moments applied laterally on the PDC drill bit via calculation in accordance with a set of equations given by said drilling response matrix.

3. The method of claim 2, said orthogonal force components being weight-on-bit, bit side force in two mutually perpendicular in-plane directions, and bending moments in an x-direction and a y-direction, said cutting actions being actual cutting rate, side cutting rates in an x-direction and a y-direction, and bit turning rates about an x-axis and a y-axis.

4. The method of claim 1, said step of determining the bit deviation tendency comprising:

determining an inclination deviation tendency of the PDC drill bit; and calculating a walk tendency of the PDC drill bit.

5. The method of claim 1, said step of determining side forces and bending moments further comprising:

measuring lateral displacement and rotation of the PDC drill bit.

6. The method of claim 1, said step of estimating further comprising:

estimating response characteristics of the PDC drill bit following at least one complete revolution of the PDC drill bit.

7. The method of claim 1, said step of measuring comprising:

integrating individual cutter forces over an entire profile of a bit face so as to determine total force and moment on the bit.

8. The method of claim 1, further comprising the step of:

determining an intrinsic walk angle between a direction of the side forces and an actual side advance of the PDC drill bit, said step of controlling comprising moving said PDC drill bit relative to said intrinsic walk angle of the PDC drill bit.

9. The method of claim 4, said walk tendency of PDC drill said bit being substantially anti-walk, said PDC drill bit having a bottom hole assembly with a zero tool face angle, further comprising the step of:

determining formation dip for anisotropic formations based on an actual previously known walk tendency of the PDC drill bit in the formations.

10. The method of claim 1, further comprising the step of:

determining a dip of a formation interface based on an observation of time-varying changes in the determined side forces and bending moments of the bit.

* * * * *